Dec. 8, 1925.

M. G. FINN 1,565,077

HOLDER FOR BAKED APPLES

Filed April 2, 1925

WITNESSES
H. T. Walker
Robert J. Hulinger

Mary Giles Finn
INVENTOR

BY Munn & Co.
ATTORNEYS

Patented Dec. 8, 1925.

1,565,077

UNITED STATES PATENT OFFICE.

MARY GILES FINN, OF MOUNT VERNON, NEW YORK.

HOLDER FOR BAKED APPLES.

Application filed April 2, 1925. Serial No. 20,279.

*To all whom it may concern:*

Be it known that I, MARY GILES FINN, a citizen of the United States, and a resident of Mount Vernon, in the county of Westchester and State of New York, have invented a Holder for Baked Apples, of which the following is a full, clear, and exact description.

This invention relates to a holder for baked apples. An object of this invention is to provide means for holding the individual apple while it is being baked and until it is eaten, the apple being served on the holder.

Another object concerns the provision of means whereby the apple is more thoroughly cooked.

A further object concerns the provision of means whereby the apple is retained in its initial shape.

A still further object concerns the provision of means whereby the holder and the apple can be very easily removed from the baking pan.

The invention is illustrated in the drawings, of which—

Figure 1:
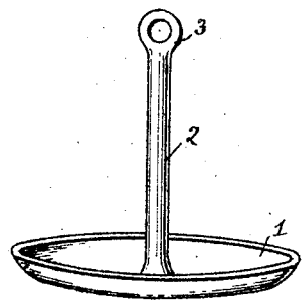
Figure 1 is a perspective view of the device.
Figure 2:
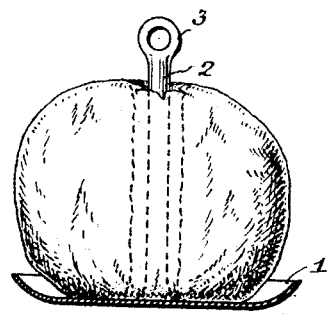
Figure 2 is a similar view showing the apple in place.
Figure 3:
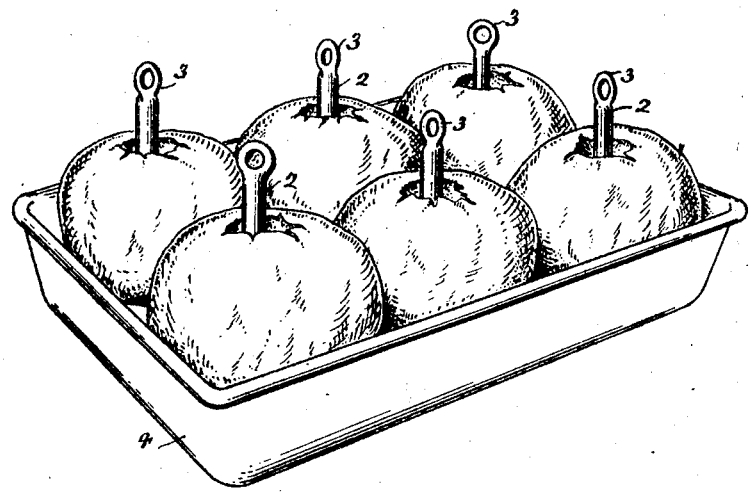
Figure 3 is a similar view showing a pan with apples therein supported on their holders.

The form of the invention shown in the drawings is a preferred form, although it is understood that modifications in the construction and arrangement of the parts and in the character of the materials used may be adopted without departing from the spirit of the invention as set forth in the appended claim.

In its general aspect the invention relates to the provision of a shallow dishlike holder for a baked apple, having an integral stem extending upwardly therefrom through the cored portion of the apple. In baking apples it is the general custom to clean and core them before putting them in a pan and baking in the oven. In the course of baking, the apples, of course, become soft and the juices from the apples run off over the pan. Furthermore, if the apples are stuffed with nuts or other such material the stuffing will run out through the bottom of the core openings, sometimes, and not be retained therewithin, especially when the apple is lifted out of the pan to be served. In attempting to take the apples out of the pan and place them on service dishes, the apples are oftentimes broken open, because they are very soft, and the neat appearance of the apple is destroyed in the attempt to serve it. Furthermore, the juice is not retained within the apple or in close association therewith. The interior or center portion of the apple is not always as well cooked as the outer portions thereof. My invention has been developed to overcome these difficulties.

The preferred form of the invention as shown in the drawings comprises a shallow dishlike holder or support 1 for an apple, from the center of which an integral stem 2 projects upwardly, this stem being provided with an aperture 3. This dish may be made of glass, porcelain or metal. The stem 2 is adapted to extend upwardly through the opening made by the removal of the core of the apple.

The dish being only slightly larger than the apple, a plurality of them can be supported in one baking pan such as 4. When the apples are thoroughly cooked, the prong of a fork is passed through the aperture 3 and the holder with the apple thereon is lifted out and placed on a dish ready to be served. By reason of this arrangement, the juice of the apple is retained on the holder, the stuffing is held in the core opening, and the apple is held in a more rigid, natural position on account of the stem 2. This stem becomes heated, and, being more intimately related with the inner portion of the apple, will more effectively cause the cooking of the interior portion of the apple.

What I claim is:—

A baking and serving holder for fruit, which comprises a shallow, dishlike receptacle having a substantially flat bottom and an integral stem extending upwardly therefrom near the center thereof, said bottom being constructed of comparatively thin material of uniform thickness throughout and being of approximately the same diameter as the fruit to be held thereon, said stem being constructed to extend through the core of the fruit and above the top thereof, and being provided at its top with an aperture whereby the receptacle can be lifted.

MARY GILES FINN.